United States Patent
Woo et al.

(10) Patent No.: US 11,437,899 B2
(45) Date of Patent: Sep. 6, 2022

(54) APPARATUS FOR SENSING ROTOR LOCATION AND MOTOR COMPRISING APPARATUS

(71) Applicant: LG INNOTEK CO., LTD., Seoul (KR)

(72) Inventors: Shung Hun Woo, Seoul (KR); Nam Hoon Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/121,134

(22) Filed: Dec. 14, 2020

(65) Prior Publication Data

US 2021/0099061 A1   Apr. 1, 2021

Related U.S. Application Data

(63) Continuation of application No. 16/329,620, filed as application No. PCT/KR2017/009704 on Sep. 5, 2017, now Pat. No. 10,903,731.

(30) Foreign Application Priority Data

Sep. 5, 2016   (KR) ................. 10-2016-0114082
Dec. 21, 2016   (KR) ................. 10-2016-0175775

(51) Int. Cl.
   *H02K 29/08*   (2006.01)
   *H02K 11/215*   (2016.01)
   *G01D 5/245*   (2006.01)
   *G01D 5/14*   (2006.01)

(52) U.S. Cl.
   CPC ............. *H02K 29/08* (2013.01); *G01D 5/142* (2013.01); *G01D 5/145* (2013.01); *G01D 5/2451* (2013.01);

(Continued)

(58) Field of Classification Search
   CPC ...... H02K 11/215; H02K 11/21; H02K 11/24; H02K 29/14; H02K 29/08

(Continued)

(56) References Cited

U.S. PATENT DOCUMENTS

| 6,019,683 A | 2/2000 | Sudau |
| 6,119,840 A | 9/2000 | Dettmar |

(Continued)

FOREIGN PATENT DOCUMENTS

| JP | 2001-349747 A | 12/2001 |
| JP | 2002-262541 A | 9/2002 |

(Continued)

OTHER PUBLICATIONS

International Search Report in International Application No. PCT/KR2017/009704, filed Sep. 5, 2017.

(Continued)

*Primary Examiner* — Jose A Gonzalez Quinones
(74) *Attorney, Agent, or Firm* — Saliwanchik, Lloyd & Eisenchenk

(57) ABSTRACT

The present invention provides an apparatus for sensing rotor location, the apparatus comprising: a central shaft; a magnet coupled to the central shaft; a sensor portion is disposed correspond to the magnet; wherein the sensor portion comprising a substrate, a first group including a first Hall sensor and a third Hall sensor disposed on the substrate, and a second group including a second Hall sensor and a fourth Hall sensor, the first Hall sensor and the third Hall sensor are arranged to overlap in a radial direction about the central shaft and the second Hall sensor and the fourth Hall sensor are arranged to overlap in a radial direction about the central shaft.

20 Claims, 15 Drawing Sheets

(52) U.S. Cl.
CPC ......... *H02K 11/215* (2016.01); *G01D 5/2452* (2013.01); *G01D 5/2457* (2013.01); *H02K 2213/03* (2013.01)

(58) Field of Classification Search
USPC ....................................................... 310/68 B
See application file for complete search history.

(56) References Cited

U.S. PATENT DOCUMENTS

| | | | |
|---|---|---|---|
| 9,356,496 B2* | 5/2016 | Hannewald | ............ H02K 15/03 |
| 2004/0188216 A1 | 9/2004 | Yamazaki | |
| 2014/0167572 A1* | 6/2014 | Woo | ..................... H02K 11/215 310/68 B |
| 2014/0167743 A1 | 6/2014 | Park | |
| 2017/0072936 A1 | 3/2017 | Inagawa | |

FOREIGN PATENT DOCUMENTS

| | | |
|---|---|---|
| JP | 2007-252096 A | 9/2007 |
| JP | 2007252096 A * | 9/2007 |
| JP | 2009-128246 A | 6/2009 |
| JP | 2010-243152 A | 10/2010 |
| KR | 10-2006-0101998 A | 9/2006 |
| KR | 10-2009-0050650 A | 5/2009 |
| KR | 10-2013-0044505 A | 5/2013 |
| KR | 10-2014-0078796 A | 6/2014 |

OTHER PUBLICATIONS

Supplementary European Search Report dated Jul. 23, 2019 in European Application No. 17847066.2.
Office Action dated Oct. 7, 2019 in Korean Application No. 10-2016-0114082.
Decision of Patent dated Jan. 9, 2020 in Korean Application No. 10-2016-0114082, along with its English translation.
First Notice of Allowance dated Jun. 9, 2020 in U.S. Appl. No. 16/329,620.
Second Notice of Allowance dated Sep. 21, 2020 in U.S. Appl. No. 16/329,620.
Office Action dated Oct. 13, 2021 in Korean Application No. 10-2020-0042915.

* cited by examiner

[FIG. 1]
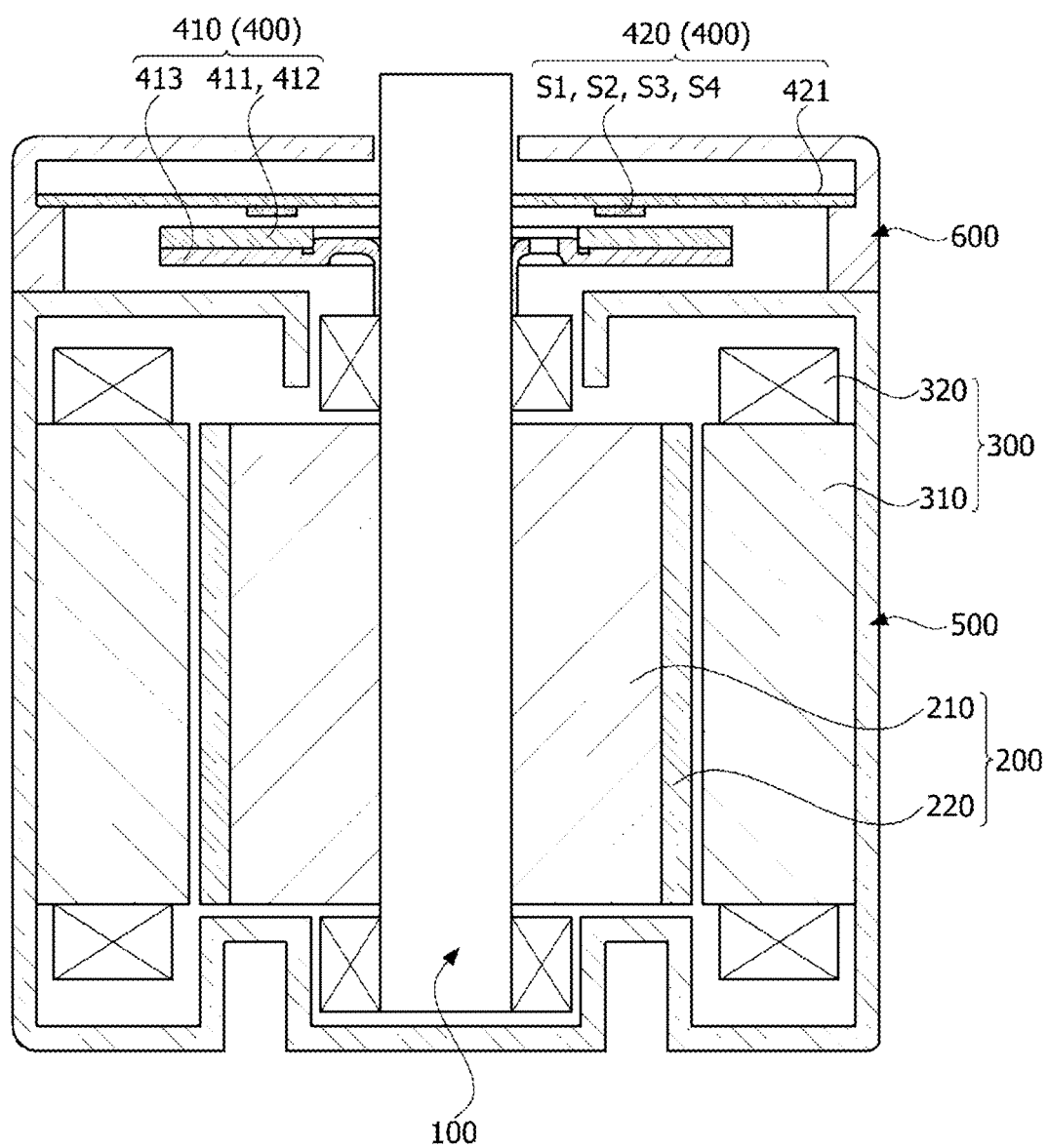

[FIG. 2]
410
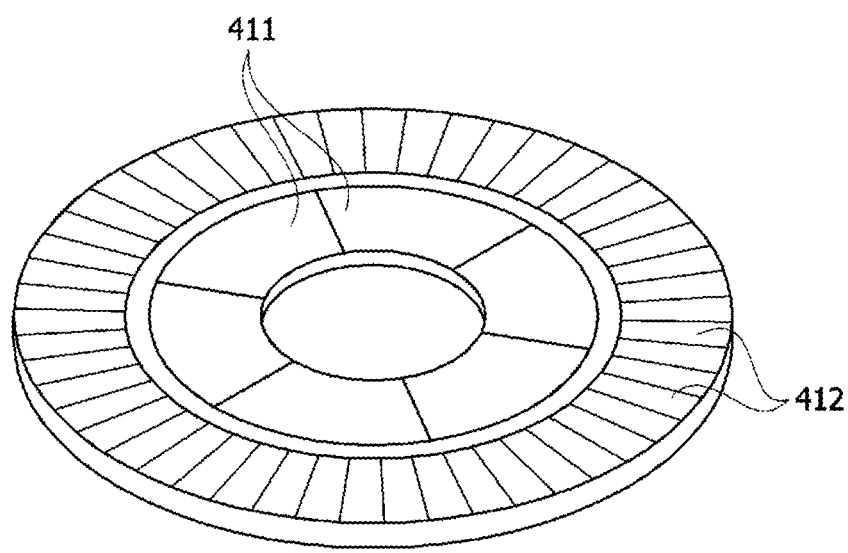
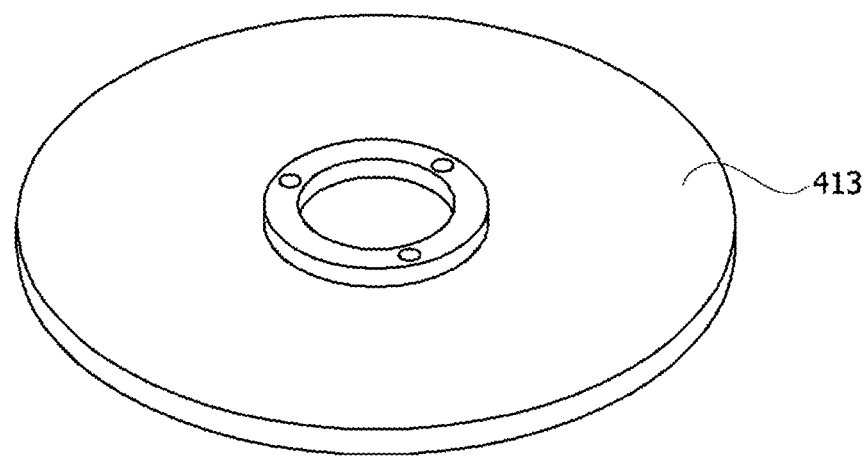

[FIG. 3]
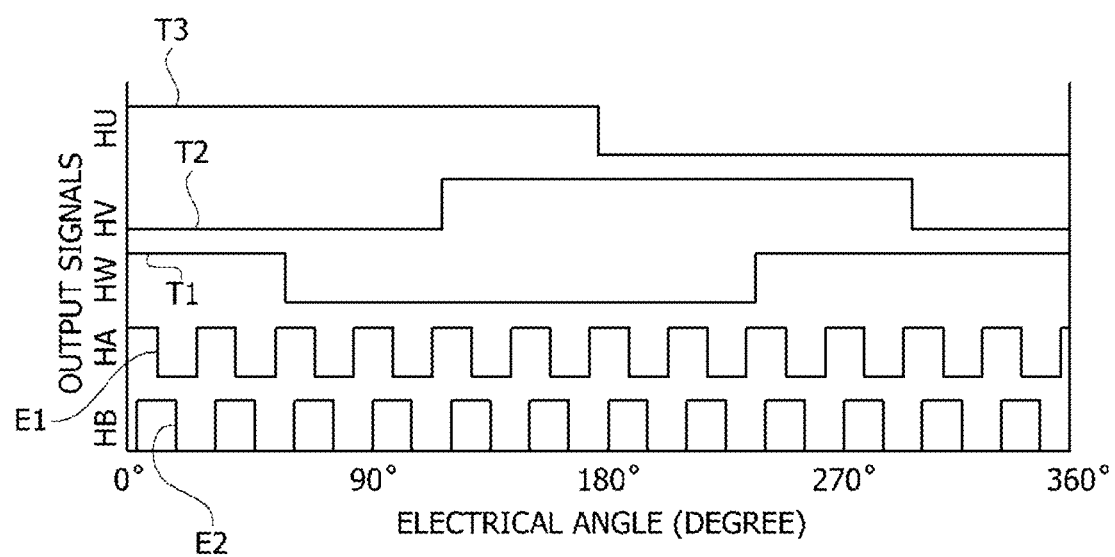

[FIG. 4]
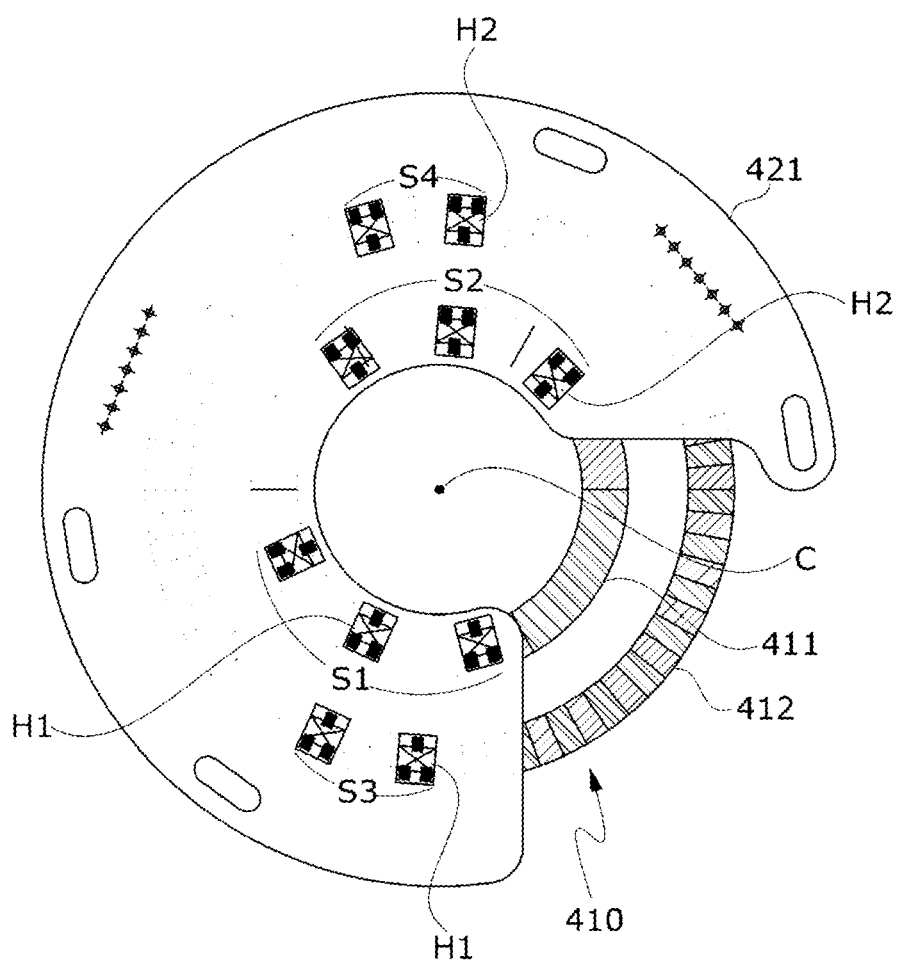

[FIG. 5]
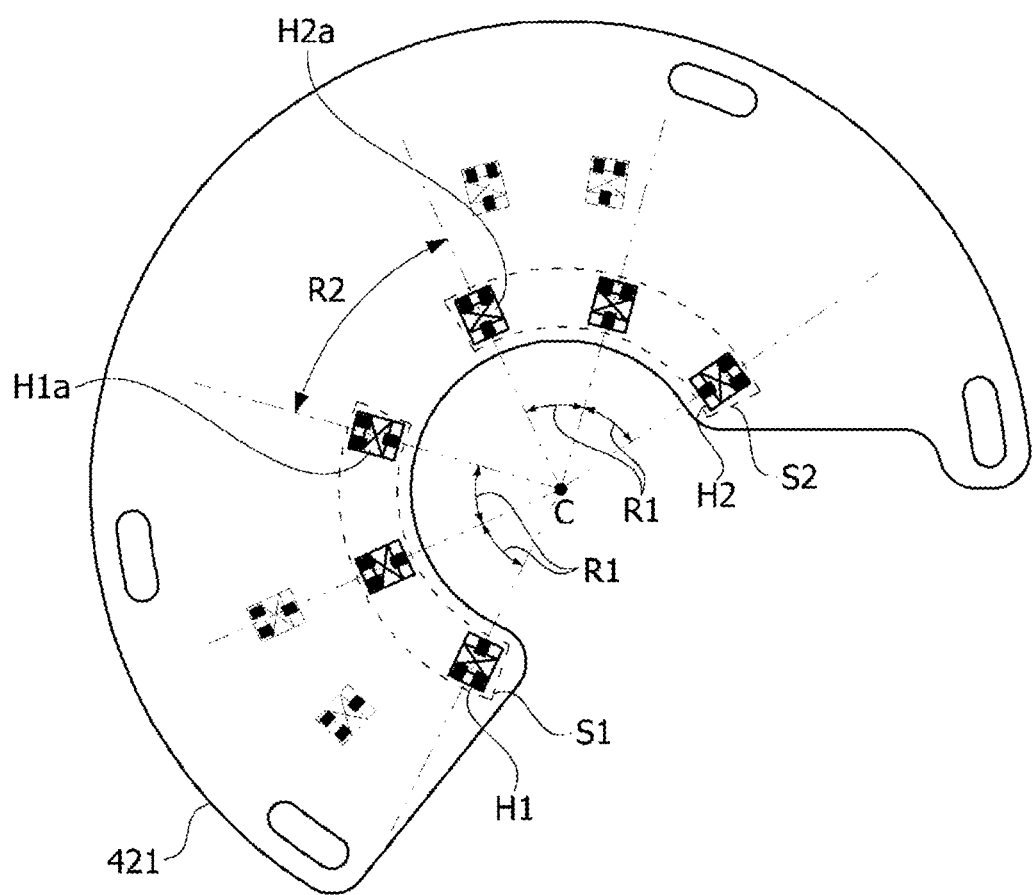

[FIG. 6]
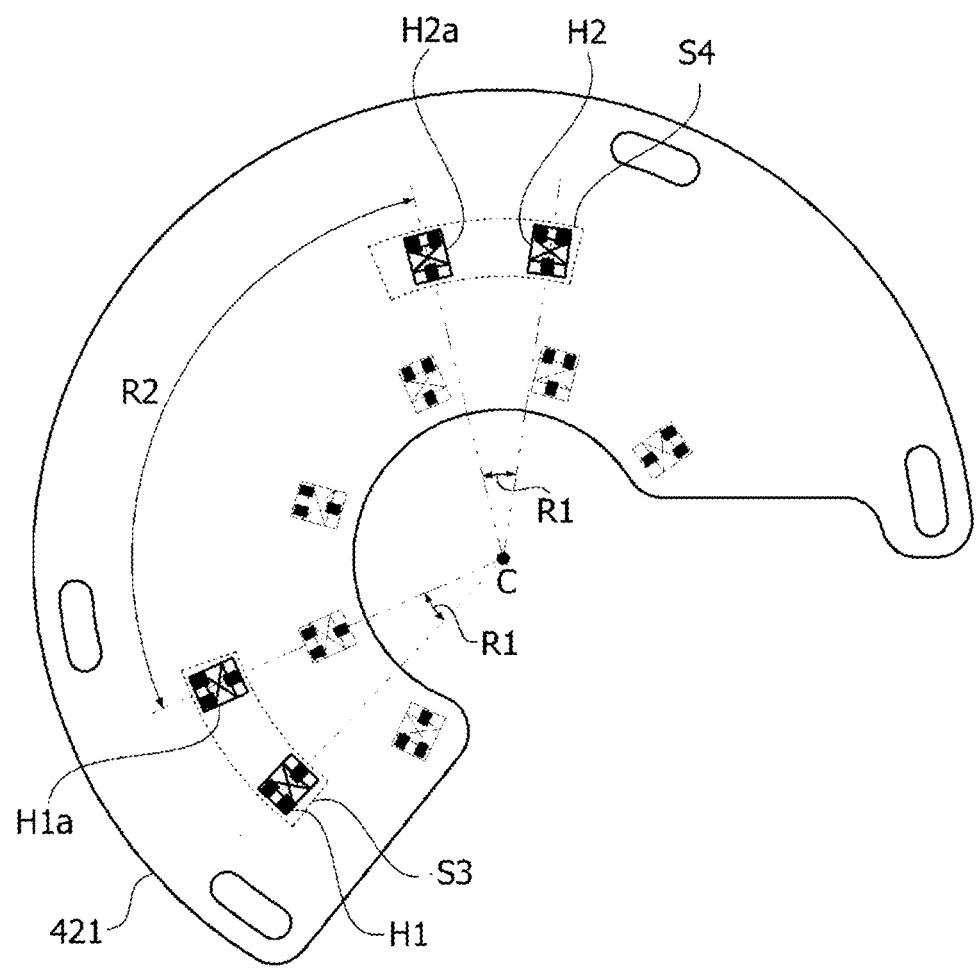

[FIG. 7]
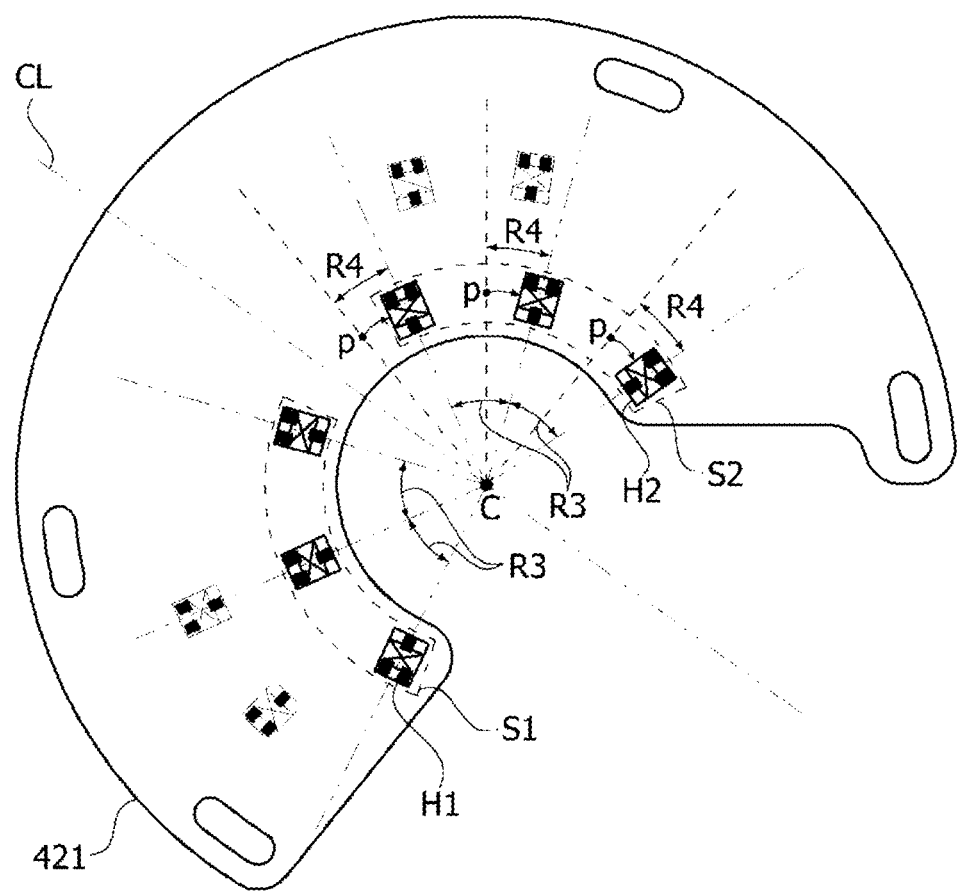

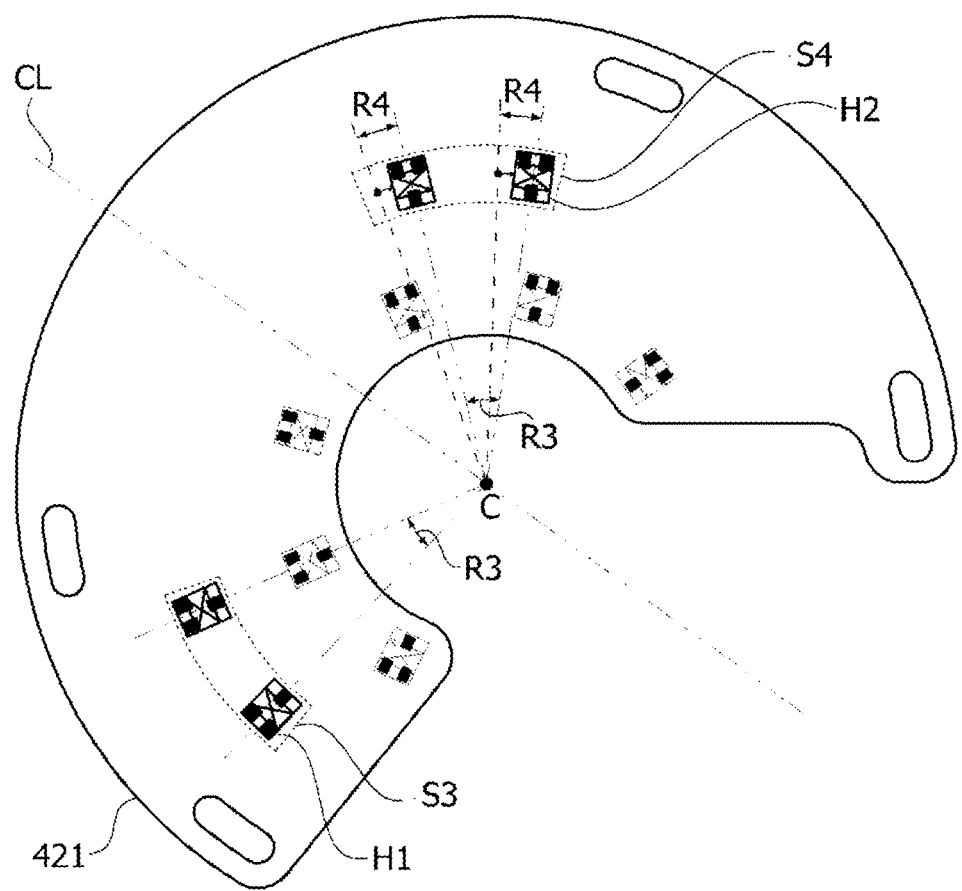
[FIG. 8]

[FIG. 9A]
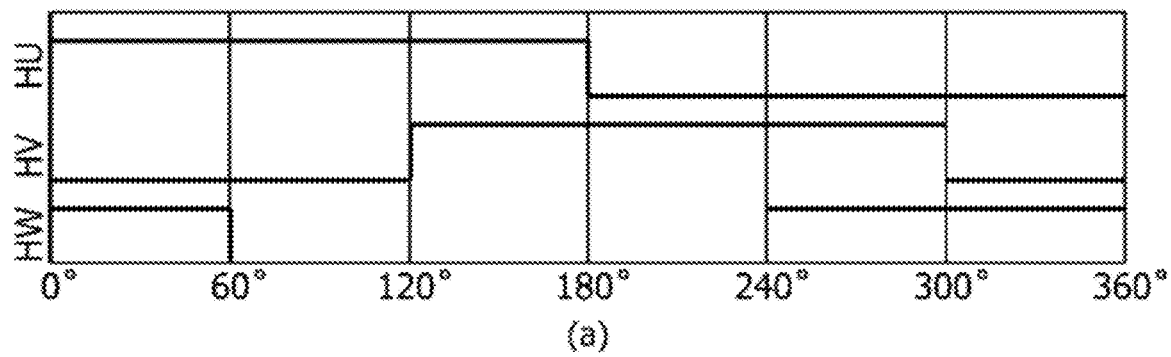
(a)
[FIG. 9B]
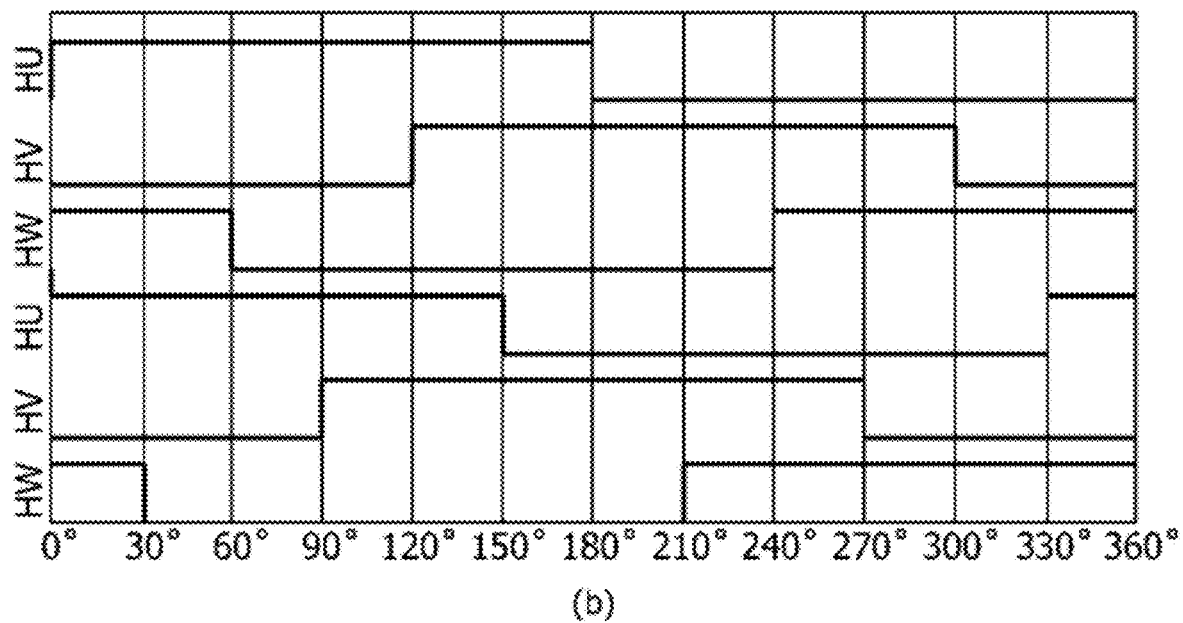
(b)

[FIG. 10A]
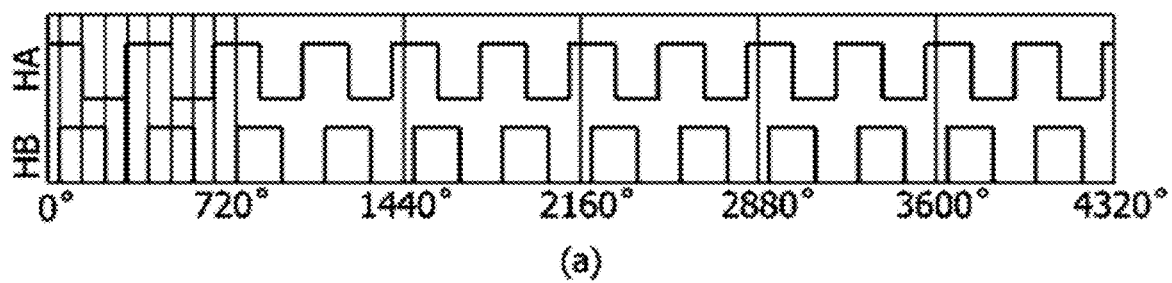
(a)
[FIG. 10B]
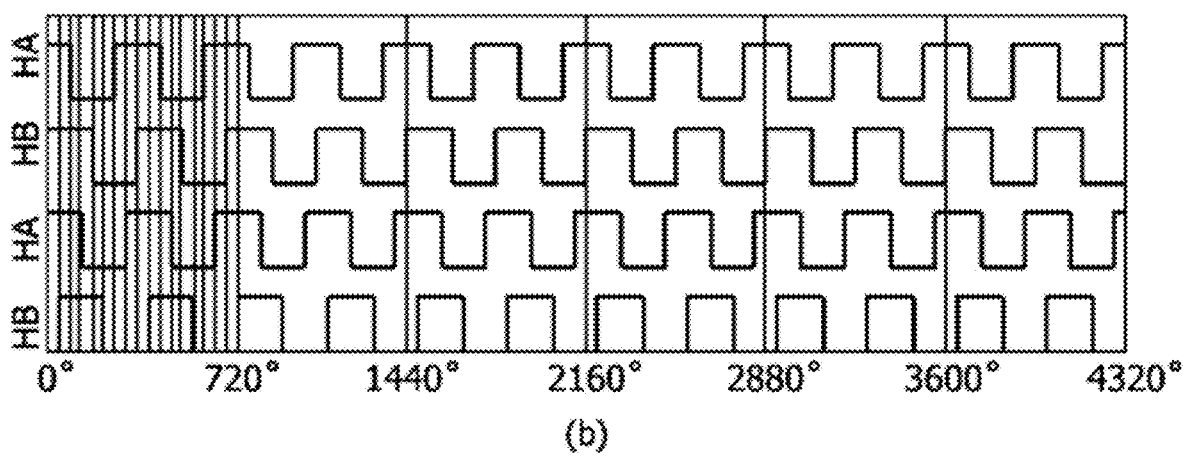
(b)

[FIG. 11]
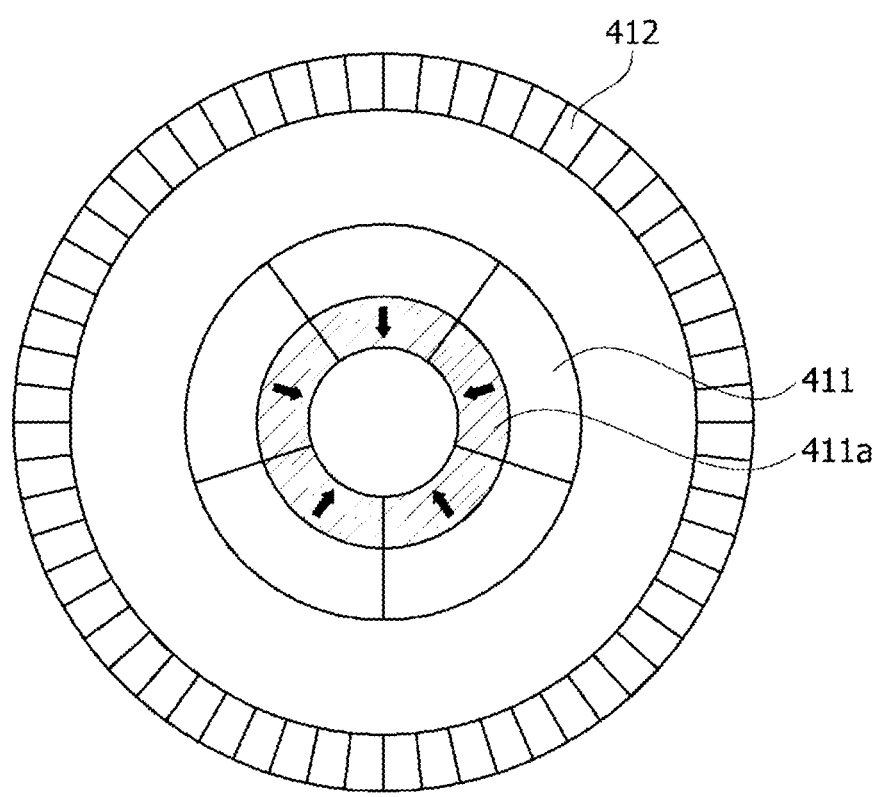

[FIG. 12]
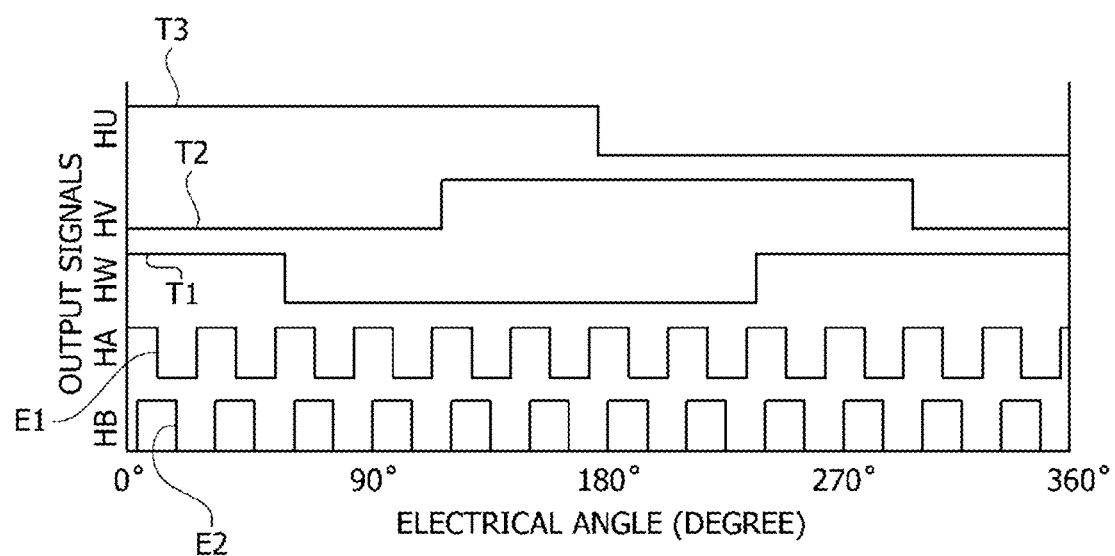

[FIG. 13]
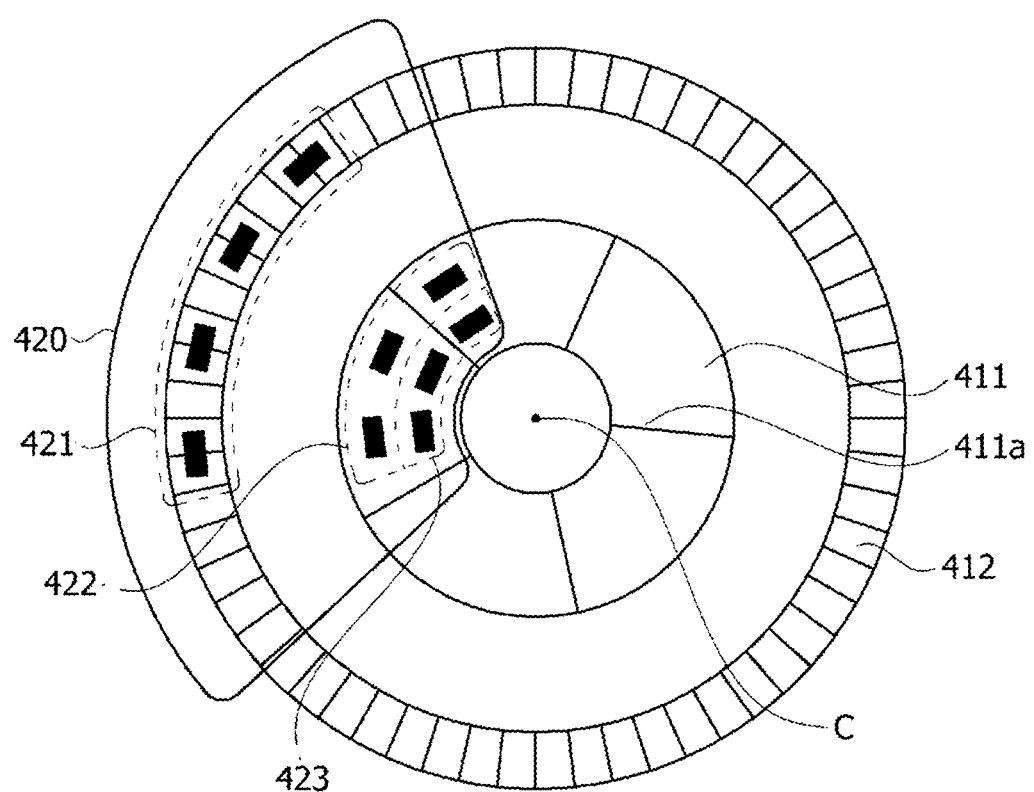

[FIG. 14]
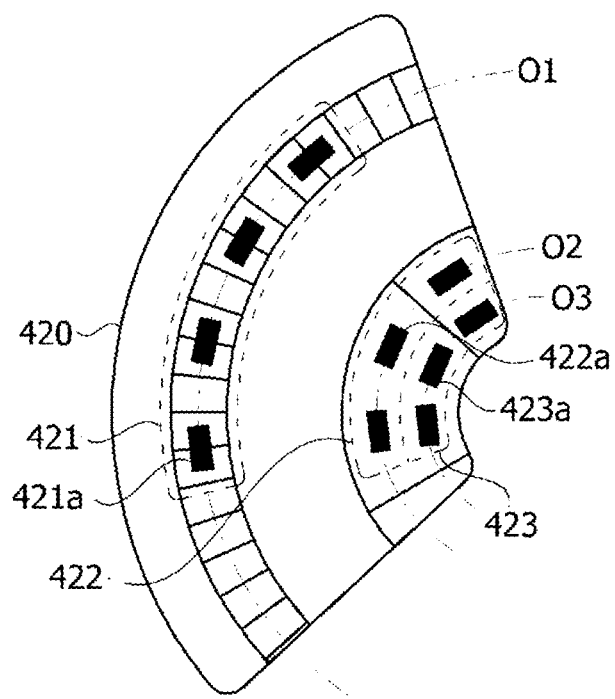

[FIG. 15]
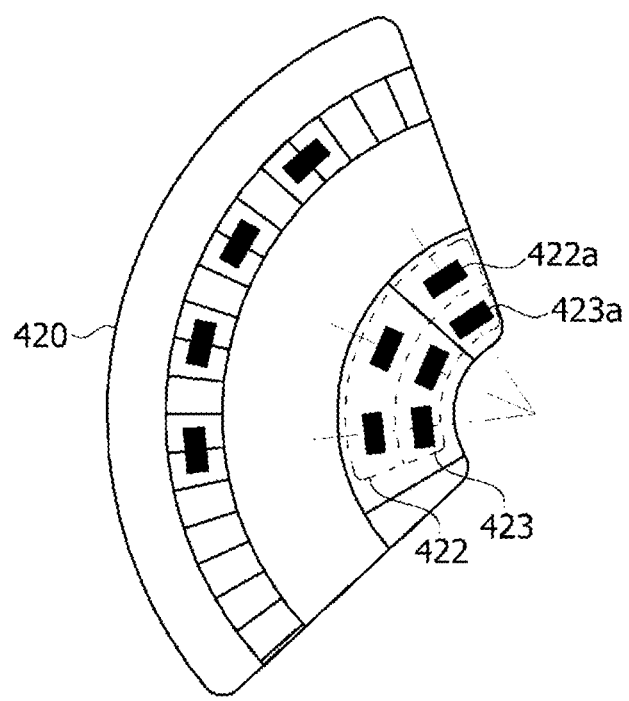

APPARATUS FOR SENSING ROTOR LOCATION AND MOTOR COMPRISING APPARATUS

CROSS-REFERENCE TO RELATED APPLICATIONS

This application is a continuation of U.S. patent application Ser. No. 16/329,620, filed Feb. 28, 2019; which is the U.S. national stage application of International Patent Application No. PCT/KR2017/009704, filed Sep. 5, 2017; which claims the benefit under 35 U.S.C. § 119 of Korean Patent Application Nos. 10-2016-0114082, filed Sep. 5, 2016; and 10-2016-0175775, filed Dec. 21, 2016; the disclosures of each of which are incorporated herein by reference in their entirety.

TECHNICAL FIELD

An embodiment relates to a rotor location sensing apparatus and a motor including the same.

BACKGROUND ART

Generally, a rotor is rotated due to an electromagnetic interaction between the rotor and a stator in a motor. Here, since a rotating shaft inserted into the rotor is also rotated, a rotational driving force is generated.

A sensor including a magnetic element is disposed inside the motor as a rotor location sensing apparatus. The sensor grasps a present location of the rotor by sensing a magnetic force of the magnet installed to be rotatable in conjunction with the rotor.

Generally, at least three sensors are required for a three-phase brushless motor. This is because three sensing signals are required to obtain information on a U-phase, a V-phase, and a W-phase. However, there is a problem in that the entire rotor location sensing apparatus may not be driven when one of the three sensors fails. Particularly, in consideration of a sensor with frequent failures, there is a problem in that the entire rotor location sensing apparatus is required to be replaced due to a single sensor failure, which causes a great economic loss.

Further, when a rotor location sensing apparatus is additionally installed, the added rotor location sensing apparatus needs to be installed separately in a different region from a region where the existing rotor location sensing apparatus is installed. This is because a magnet and a sensor of the added rotor location sensing apparatus need to be aligned with each other. Further, in the rotor location sensing apparatus, the arrangement of additional sensors and a design of a substrate are complicated, and thus space constraints are great.

Meanwhile, since a resolution of a sensing signal is low due to the limitation of a magnetizing accuracy of the magnet, the present location of the rotor may not be precisely grasped.

DISCLOSURE

Technical Problem

An embodiment is directed to providing a rotor location sensing apparatus capable of being driven despite a failure of some sensors and a motor including the same. Particularly, an embodiment is also directed to providing a rotor location sensing apparatus capable of being driven on an existing printed circuit board (PCB) without a separate additional structure and a motor including the same.

An embodiment is also directed to providing a rotor location sensing apparatus capable of increasing a resolution of a sensing signal without adding a sensor and a motor including the same.

An embodiment is also directed to providing a rotor location sensing apparatus having two channels on an existing substrate thereof without an additional structure and a motor including the same.

Objectives to be achieved by embodiments of the present invention are not limited to the above-described objectives, and other objectives, which are not described above, may be clearly understood by those skilled in the art through the following specification.

Technical Solution

An embodiment provides an apparatus for sensing a rotor location, the apparatus including a magnet and a substrate disposed above the magnet, wherein the magnet includes a main magnet and a sub-magnet, and the substrate includes a first sensor and a second sensor which are disposed on the same track having a circular shape on the basis of a center of the magnet, wherein the first sensor includes a plurality of first Hall sensors adjacent to each other on the circular shaped track, and the second sensor includes a plurality of second Hall sensors adjacent to each other on the circular shaped track, wherein the plurality of first Hall sensors are disposed apart from each other by a first angle along a circumference of the circular shaped track, and the plurality of second Hall sensors are disposed apart from each other by the first angle along the circumference on the circular shaped track, and wherein the first Hall sensor and the second Hall sensor, which are adjacent to each other, are disposed apart from each other by a second angle different from the first angle along the circumference on the circular shaped track.

The first sensor and the second sensor may be disposed to correspond to the main magnet in a radial direction of the magnet.

The first angle may be R1 calculated in Equation 1 below, $$R1 = R0/3$$

$$R0 = 360°/(Nm/2) \quad \text{<Equation 1>}$$

wherein R1 is the first angle, R0 is an electrical angle, and Nm is the number of poles of the main magnet.

The second angle may be R2 calculated by Equation 2 below, $$R2 = R1 \pm R0'/(Nm/2) \quad \text{<Equation 2>}$$

wherein R2 is the second angle, R1 is the first angle, R0' is an electrical angle to be shifted, and Nm is the number of the poles of the main magnet.

The first sensor may include three first Hall sensors, and the second sensor may include three second Hall sensors.

When the number of poles of the main magnet is six, the second angle may be 10°.

The first sensor and the second sensor may be disposed to correspond to the sub-magnet in a radial direction of the magnet.

The first angle may be R1 calculated by Equation 3 below, $$R1 = R0 \times n + R3/(Ns/2) \quad (n \text{ is an integer})$$

$$R0 = 360°/(Ns/2) \quad \text{<Equation 3>}$$

wherein R1 is the first angle, R0 is an electrical angle, R3' is a resolution angle, and Ns is the number of poles of the sub-magnet.

The second angle may be R4 calculated by Equation 4 below, $$R2 = R1 \pm R0'/(Ns/2) \qquad \text{<Equation 4>}$$

wherein R2 is the second angle, R1 is the first angle, R0' is an electrical angle to be shifted, and Ns is the number of poles of the sub-magnet.

The first sensor may include two first Hall sensors, and the second sensor may include two second Hall sensors.

When the number of poles of the main magnet is 72, the second angle may be a value obtained by adding 1.25° to 10°×n+2.5°. Here, n is an integer.

Another aspect of the present invention provides an apparatus for sensing a rotor location, the apparatus including a magnet and a substrate disposed above the magnet, wherein the magnet includes a main magnet and a sub-magnet, and the substrate includes a first sensor and a second sensor which are disposed on the same track having a circular shape on the basis of a center of the magnet, wherein the first sensor includes a plurality of first Hall sensors adjacent to each other on the circular shaped track, and the second sensor includes a plurality of second Hall sensors adjacent to each other on the circular shaped track, wherein the plurality of first Hall sensors are disposed apart from each other by a third angle along a circumference on the circular shaped track, and the plurality of second Hall sensors are disposed apart from each other by the third angle along the circumference on the circular shaped track, and wherein the second sensor is disposed at a location shifted from a location symmetrical to the first sensor by a fourth angle along a circumference of the circular shaped track on the basis of a reference line passing through a center of the circular shaped track.

The first sensor and the second sensor may be disposed to correspond to the main magnet in a radial direction of the magnet.

The third angle may be R3 calculated by Equation 5 below, $$R3 = R0/3$$

$$R0 = 360°/(Nm/2) \qquad \text{<Equation 5>}$$

wherein R3 is the third angle, R0 is an electrical angle, and Nm is the number of poles of the main magnet.

The fourth angle may be R4 calculated by Equation 6 below, $$R4 = R3 \pm R0'/(Nm/2) \qquad \text{<Equation 6>}$$

wherein R4 is the fourth angle, R3 is the third angle, R0' is an electrical angle to be shifted, and Nm is the number of poles of the main magnet.

The first sensor may include three first Hall sensors, and the second sensor may include three second Hall sensors.

When the number of poles of the main magnet is six, the fourth angle may be 10°.

The first sensor and the second sensor may be disposed to correspond to the sub-magnet in a radial direction of the magnet.

The third angle may be R3 calculated by Equation 7 below, $$R3 = R0 \times n + R3'/(Ns/2) \text{ ($n$ is an integer)}$$

$$R0 = 360°/(Ns/2) \qquad \text{<Equation 7>}$$

wherein R3 is the third angle, R0 is an electrical angle, R3' is a resolution angle, and N is the number of poles of the sub-magnet.

The fourth angle may be R4 calculated by Equation 8 below, $$R4 = R3 \pm R0'/(Ns/2) \qquad \text{<Equation 8>}$$

wherein R4 is the fourth angle, R3 is the third angle, R0' is an electrical angle to be shifted, and Ns is the number of poles of the sub-magnet.

The first sensor may include two first Hall sensors and the second sensor may include two second Hall sensors.

When the number of poles of the sub-magnet is 72, the fourth angle may be 1.25°.

Still another aspect of the present invention provides a motor including a rotating shaft, a rotor including a hole in which the rotating shaft is disposed, a stator disposed at an outside of the rotor, and an apparatus for sensing a rotor location disposed above the rotor, wherein the apparatus for sensing a rotor location includes a magnet and a substrate disposed above the magnet, wherein the magnet includes a main magnet and a sub-magnet, and the substrate includes a first sensor and a second sensor which are disposed on the same track having a circular shape on the basis of a center of the magnet, wherein the first sensor includes a plurality of first Hall sensors adjacent to each other on the circular shaped track, and the second sensor includes a plurality of second Hall sensors adjacent to each other on the circular shaped track, wherein the plurality of first Hall sensors are disposed apart from each other by a first angle along a circumference on the circular shaped track, and the plurality of second Hall sensors are disposed apart from each other by the first angle along the circumference on the circular shaped track, wherein the first hall sensor and the second hall sensor, which are adjacent to each other, are disposed apart from each other by a second angle different from the first angle along the circumference on the circular shaped track.

Yet another aspect of the present invention provides a motor including a rotating shaft, a rotor including a hole in which the rotating shaft is disposed, a stator disposed at an outside of the rotor, and an apparatus for sensing a rotor location disposed above the rotor, wherein the apparatus for sensing a rotor location includes a magnet and a substrate disposed above the magnet, wherein the magnet includes a main magnet and a sub-magnet, and the substrate includes a first sensor and a second sensor which are disposed on the same track having a circular shape on the basis of a center of the magnet, wherein the first sensor includes a plurality of first Hall sensors adjacent to each other on the circular shaped track, and the second sensor includes a plurality of second Hall sensors adjacent to each other on the circular shaped track, wherein the plurality of first Hall sensors are disposed apart from each other by a third angle along a circumference on the circular shaped track, and the plurality of second Hall sensors are disposed apart from each other by the third angle along the circumference on the circular shaped track, and wherein the second sensor is disposed at a location shifted from a location symmetrical to the first sensor by a fourth angle along the circumference of the circular shaped track on the basis of a reference line passing through a center of the circular shaped track.

Yet another aspect of the present invention provides an apparatus for sensing a rotor location, the apparatus including a magnet and a substrate disposed above the magnet, wherein the magnet includes a main magnet and a sub-magnet, and the substrate includes a first sensor, a second sensor, and a third sensor, wherein the first sensor, the second sensor, and the third sensor are respectively disposed on circular shaped tracks which are different from each other on the basis of a center of the magnet.

The first sensor may be disposed to correspond to the sub-magnet in a radial direction of the magnet.

The second sensor and the third sensor may be disposed to correspond to the main magnet in a radial direction of the magnet.

The second sensor may include a plurality of second Hall sensors, the third sensor may include a plurality of third Hall sensors, and the second Hall sensors and the third Hall sensors may be aligned and disposed in a circumferential direction.

The second sensor may be connected to the third sensor in parallel.

The first sensor may include four first Hall sensors, the second sensor may include three second Hall sensors, and the third sensor may include three third Hall sensors.

The substrate may include a controller connected to the first sensor, the second sensor, and the third sensor, and the controller may sense a location of a rotor on the basis of another sensing signal when any one of the second sensor and the third sensor is determined to be faulty.

Yet another aspect of the present invention provides a motor including a rotating shaft, a rotor including a hole in which the rotating shaft is disposed, a stator disposed at an outside of the rotor, and an apparatus for sensing a rotor location disposed above the rotor, wherein the apparatus for sensing a rotor location includes a magnet and a substrate disposed above the magnet, wherein the magnet includes a main magnet and a sub-magnet, and the substrate includes a first sensor, a second sensor, and a third sensor, wherein the first sensor, the second sensor, and the third sensor are respectively disposed on circular shaped tracks different from each other on the basis of a center of the magnet.

The rotor may include a rotor core and a plurality of magnets disposed while surrounding an outer circumferential surface of the rotor core.

A can member in which the rotor core and the magnets are accommodated may be further included.

The plurality of magnets are disposed in a single-stage on an outer circumferential surface of the rotor core, and the plurality of magnets may be disposed to be spaced apart from each other by a certain distance.

The first sensor may be disposed to correspond to the sub-magnet in a radial direction of the magnet.

The second sensor and the third sensor may be disposed to correspond to the main magnet in a radial direction of the magnet.

The second sensor may include a plurality of second Hall sensors, the third sensor may include a plurality of third Hall sensors, and the second Hall sensors and the third Hall sensors may be aligned and disposed in a circumferential direction.

The second sensor may be connected to the third sensor in parallel.

The first sensor may include four first Hall sensors, the second sensor may include three second Hall sensors, and the third sensor may include three third Hall sensors.

Advantageous Effects

According to embodiments, there is provided an advantageous effect in which a location of a rotor can be sensed even when a failure occurs in a first sensor by disposing a second sensor in addition to the first sensor, According to embodiments, there is provided an advantageous effect in which a location of a rotor can be accurately grasped by shifting a location of a second sensor by a certain angle from a location corresponding to a location of a first sensor such that a resolution is doubled.

According to embodiments, there is provided an advantageous effect of implementing a two-channel sensing configuration on an existing printed circuit board (PCB) without a separate additional structure by adding sensors in parallel to the existing PCB and extending a magnet.

DESCRIPTION OF DRAWINGS

FIG. 1 is a conceptual view illustrating a motor according to an embodiment.

FIG. 2 is a view illustrating a magnet.

FIG. 3 is a view illustrating a sensing signal.

FIG. 4 is a view illustrating a rotor location sensing apparatus.

FIG. 5 is a view illustrating a first embodiment of an arrangement of a first sensor and a second sensor which are corresponding to a main magnet.

FIG. 6 is a view illustrating a first embodiment of an arrangement of a first sensor and a second sensor which are corresponding to a sub-magnet.

FIG. 7 is a view illustrating a second embodiment of an arrangement of a first sensor and a second sensor which are corresponding to a main magnet.

FIG. 8 is a view illustrating a first sensor and a second sensor on the basis of an outer side sensor.

FIGS. 9A and 9B are graphs illustrating a comparison between a conventional sensing signal having a resolution of 60° (FIG. 9A) and a sensing signal increased in resolution to 30° (FIG. 9B) with respect to a main magnet.

FIGS. 10A and 10B are graphs illustrating a comparison between a conventional sensing signal having a resolution of 90° (FIG. 10A) and a sensing signal increased in resolution to 45° (FIG. 10B) with respect to sub magnet.

FIG. 11 is a view illustrating an extended region of a main magnet.

FIG. 12 is a view illustrating a sensing signal.

FIG. 13 is a view illustrating a rotor location sensing apparatus according to the embodiment.

FIG. 14 is a view illustrating a first sensor, a second sensor, and a third sensor.

FIG. 15 is a view illustrating the second sensor and the third sensor which are aligned and disposed in a circumferential direction of the magnet.

MODES OF THE INVENTION

Hereinafter, embodiments of the present invention will be described with reference to the accompanying drawings in detail. Purposes, specific advantages, and novel features of the invention will be made clear from embodiments and the following detailed description in connection with the accompanying drawings. In the description of the invention, when it is determined that detailed descriptions of related well-known functions unnecessarily obscure the gist of the invention, the detailed descriptions thereof will be omitted.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes any and all combinations of one or more of the associated listed items.

FIG. 1 is a conceptual view illustrating a motor according to an embodiment. Referring to FIG. 1, the motor according to the embodiment may include a rotating shaft 100, a rotor 200, a stator 300, and a rotor location sensing apparatus 400.

The rotating shaft 100 may be coupled to the rotor 200. When an electromagnetic interaction is generated between the rotor 200 and the stator 300 through the supply of current, the rotor 200 rotates, and the rotating shaft 100 rotates in conjunction with the rotation. The rotating shaft 100 may be connected to a steering shaft of a vehicle to transfer power to the steering shaft. The rotating shaft 100 may be supported by a bearing.

The rotor 200 rotates through an electric interaction with the stator 300.

The rotor 200 may include a rotor core 210 and a magnet 220. The rotor core 210 may be formed in a shape in which a plurality of plates having a circular thin steel sheet shape are stacked. A hole may be formed at a center of the rotor core 210 so that the rotating shaft 100 is coupled thereto. A protrusion configured to guide the magnet 220 may protrude from an outer circumferential surface of the rotor core 210. The magnet 220 may be attached to the outer circumferential surface of the rotor core 210. A plurality of magnets 220 may be disposed along a circumference of the rotor core 210 at regular intervals. The rotor 200 may include a can member which surrounds the magnets 220, fixes the magnets 220 so as not to be separated from the rotor core 210, and inhibits the magnets 220 from being exposed.

Meanwhile, the rotor 200 may include the single-piece rotor core 210 having a cylindrical shape and the magnets 220 disposed in a single-stage on the rotor core 210. Here, the single-stage refers to a structure in which the magnets 220 may be disposed such that there is no skew on an outer circumferential surface of the rotor 200. Accordingly, the rotor core 210 may be formed to have the same height as a height of the magnet 220 on the basis of a longitudinal section of the rotor core 210 and a longitudinal section of the magnet 220. That is, the magnet 220 may be implemented to cover the entire rotor core 210 with respect to a height direction.

The stator 300 may be wound by a coil to induce the electric interaction with the rotor 200. A detailed configuration of the stator 300 for winding a coil 320 is as follows. The stator 300 may include a stator core 310 having a plurality of teeth. The stator core 310 may be provided with a yoke portion having a ring shape and the teeth around which the coil is wound in a center direction from the yoke portion. The teeth may be provided at regular intervals along an outer circumferential surface of the yoke portion. Meanwhile, the stator core 310 may be formed by stacking a plurality of plates having a thin steel sheet shape. Further, the stator core 310 may be formed by coupling or connecting a plurality of divided cores to each other.

The rotor location sensing apparatus 400 may include a magnet 410 and a substrate 420.

A housing 500 is formed in a cylindrical shape to provide a space therein, in which the stator 300 and the rotor 200 may be mounted. Here, although a shape or material of the housing 500 may be variously changed, a metal material, which may withstand high temperatures well, may be selected. An open upper portion of the housing 500 is covered by a cover 600.

FIG. 2 is a view illustrating a magnet.

Referring to FIG. 2, the magnet 410 may include a main magnet 411, a sub-magnet 412, and a sensing plate 413. The magnet 410 is disposed above the rotor 200 to indicate a location of the rotor 200.

The sensing plate 413 is formed in a circular plate shape. In addition, the rotating shaft 100 is coupled to a center of the sensing plate 413. The main magnet 411 is disposed at a center of the sensing plate 413. In addition, the sub-magnet 412 is disposed on an outer side of the main magnet 411 and may be disposed on an edge of the sensing plate 413.

The main magnet 411 corresponds to the magnet 220 of the rotor 200. In other words, the number of poles of the magnet 220 of the rotor 200 and the number of poles of the main magnet 411 are the same. For example, when the magnet 220 of the rotor 200 has six poles, the main magnet 411 also has six poles. A pole division region of the magnet 220 of the rotor 200 is aligned with that of the main magnet 411 so that a location of the main magnet 411 may indicate a location of the magnet 220 of the rotor 200. The main magnet 411 is used to grasp an initial location of the rotor 200.

The sub-magnet 412 is used to precisely grasp a detailed location of the rotor 200. For example, the sub-magnet 412 may have 72 poles.

Sensors disposed on the substrate 420 sense a change in magnetic flux by the main magnet 411 and the sub-magnet 412 according to a rotation of the magnet 410. The substrate 420 may be disposed above the magnet 410.

FIG. 3 is a view illustrating a sensing signal.

Referring to FIG. 3, the sensors disposed on the substrate 420 may sense three sensing signals T1, T2, and T3 by sensing a change in an N-pole and S-pole of the main magnet 411. In addition, the substrate 420 may further sense two sensing signals E1 and E2 by sensing a change in magnetic flux of the sub-magnet 412.

As described above, since the magnet coupled to the rotor 200 is directly copied to the main magnet 411, the location of the rotor 200 may be sensed by sensing the change in the magnetic flux on the basis of the main magnet 411. The sensing signals T1, T2, and T3 may be used for initial driving of the motor and may feed-back U-, V-, and W-phases information, respectively.

FIG. 4 is a view illustrating a rotor location sensing apparatus.

As shown in FIG. 4, a shape of the substrate 420 may be implemented as a ring shape corresponding to an arrangement of the main magnet 411 and the sub-magnet 412.

The substrate 420 may include first sensors S1 and S3 and second sensors S2 and S4. The first sensors S1 and S3 and the second sensors S2 and S4 may be arranged on the same track having a circular shape on the basis of a center C of the magnet 410. The first sensors S1 and S3 may include a plurality of first Hall sensors H1 adjacent to each other on the circular shaped track. In addition, the second sensors S2 and S4 may include a plurality of second Hall sensors H2 adjacent to each other on the circular shaped track.

The first sensor S1 and the second sensor S2, which are located relatively further inward, may be disposed along the circular shaped track disposed on the main magnet 411. In other words, the first sensor S1 and the second sensor S2 may be disposed to correspond to the main magnet 411 in the radial direction of the magnet 410. The first sensor S3 and the second sensor S4, which are located relatively further outward, may be disposed along the circular shaped track disposed on the sub-magnet 412. In other words, the first sensor S3 and the second sensor S4 may be disposed to correspond to the sub-magnet 412 in the radial direction of the magnet 410.

First Embodiment

FIG. 5 is a view illustrating a first embodiment of an arrangement of a first sensor and a second sensor which are corresponding to a main magnet.

Referring to FIGS. 4 and 5, a first sensor S1 and a second sensor S2 disposed on an inner side of a substrate 420 sense a change in magnetic flux by a main magnet 411.

The first sensor S1 may include three first Hall sensors H1. The first sensor S1 may generate a continuous sensing signal having a U-phase, a V-phase, and a W-phase corresponding to a rotation of the main magnet 411. The three first Hall sensors H1 may be disposed to be apart from each other by a first angle R1.

The second sensor S2 may include three second Hall sensors H2. The second sensor S2 may also additionally generate the continuous sensing signal having the U-phase, the V-phase, and the W-phase corresponding to the rotation of the main magnet 411. Accordingly, the continuous sensing signal having the U-phase, the V-phase, and the W-phase may be generated even when any first Hall sensor H1 of the first sensor S1 fails. The three second Hall sensors H2 may be disposed to be apart from each other by the first angle R1 in the same manner as the first Hall sensor H1.

Here, the first angle R1 may be calculated by Equation 1 below, $$R1 = R0/3$$

$$R0 = 360°/(Nm/2) \quad \text{[Equation 1]}$$

wherein R1 is the first angle, R0 is an electrical angle, Nm is the number of poles of the main magnet 411, and a constant "3" refers to the number of a U-phase, a V-phase, and a W-phase.

For example, when the magnet 220 of the rotor 200 has six poles, the number of poles of the main magnet 411 is six. Thus, the electrical angle R0 of a corresponding motor is 120°. As a result, the first angle R1 may be calculated as 40°. Here, the electrical angle indicates a physical angle (mechanical angle) of the magnet occupied by the N pole and S pole of the magnet on the basis of 360°. For example, when the magnet 220 of the rotor 200 has eight poles, the electrical angle R0 of the corresponding motor is 90°.

The second sensor S2 may be disposed at a location shifted from a location corresponding to the first sensor S1 to increase a resolution of the sensing signal. In other words, the first sensor S1 and the second sensor S2 may be disposed on the same track having a circular shape so as to be apart from each other by a second angle R2 which is different from the first angle R1. That is, a first Hall sensor H1a and a second Hall sensor H2a, which are adjacent to each other, may be disposed along a circumference on the circular shaped track to be apart from each other by the second angle R2 different from the first angle R1.

Here, the second angle R2 may be calculated by Equation 2 below, $$R2 = R1 \pm R0'/(Nm/2) \quad \text{[Equation 2]}$$

wherein R2 is the second angle, R1 is the first angle, R0' is an electrical angle to be shifted, and Nm is the number of poles of the main magnet 411.

The resolution of the sensing signal due to the main magnet 411 may be set to 60°, and here, in a case in which a shift by an electrical angle of 30° is required to increase the resolution two times from 60° to 30°, the second angle R2 may be calculated as 30° or 50° when the R1 is 40°.

FIG. 6 is a view illustrating a first embodiment of an arrangement of a first sensor and a second sensor which are corresponding to a sub-magnet.

Referring to FIGS. 4 and 6, a first sensor S3 and a second sensor S4 disposed on an outer side of the substrate 420 sense a change in magnetic flux by a sub-magnet 412.

The first sensor S3 may include two first Hall sensors H1. The first sensor S3 may generate a continuous sensing signal corresponding to a rotation of the sub-magnet 412. The two first Hall sensors H1 may be disposed to be apart from each other by a first angle R1.

The second sensor S4 may include two second Hall sensors H2. The second sensor S4 may also additionally generate the continuous sensing signal corresponding to the rotation of the sub-magnet 412. Accordingly, the continuous sensing signal may be generated even when any first Hall sensor H1 of the first sensor S3 fails. The two second Hall sensors H2 may be disposed to be apart from each other by the first angle R1 in the same manner as the first Hall sensor H1.

Here, the first angle R1 may be calculated by Equation 3 below, $$R1 = R0 \times n + R3/(Ns/2) (n \text{ is an integer})$$

$$R0 = 360°/(Ns/2) \quad \text{[Equation 3]}$$

wherein R1 is the first angle, R0 is an electrical angle, R3' is a resolution angle, and Ns is the number of poles of the sub-magnet 412.

For example, when the number of poles of the sub-magnet 412 is 72, the electrical angle R0 of a corresponding motor is 10°. When R3 is 90°, the first angle R1 is 10°×n+2.5°. Thus, it is very difficult to dispose the two first sensors S3 physically apart from each other by the first angle R1. Accordingly, when the electrical angle R0 is 10°, 10°×n+2.5° having the same phase difference may be calculated as the first angle R1.

The second sensor S4 may be disposed at a location shifted from a location corresponding to the first sensor S3 to increase a resolution of the sensing signal. In other words, the first sensor S3 and the second sensor S4 may be disposed on the same track having a circular shape to be apart from each other by a second angle R2 different from the first angle R1. That is, a first Hall sensor H1a and a second Hall sensor H2a, which are adjacent to each other, may be disposed along a circumference on the circular shaped track to be apart from each other by the second angle R2 different from the first angle R1.

Here, the second angle R2 may be calculated by Equation 4 below, $$R2 = R1 \pm R0'/(Ns/2) \quad \text{[Equation 4]}$$

wherein R2 is the second angle, R1 is the first angle, R0' is an electrical angle to be shifted, and Ns is the number of poles of the sub-magnet 412. Accordingly, when the electrical angle R0' to be shifted is 45° and the number of poles of the sub-magnet 412 is 72, the second angle R2 is a value obtained by adding 1.25° to 10°×n+2.5° which is the first angle R1.

As a result, as shown in FIG. 6, the resolution of the sensing signal may be increased from 90° to 45° by disposing the first Hall sensor H1a and the second Hall sensor H2a, which are adjacent to each other, to be apart from each other by the value obtained by adding 1.25° to 10°×n+2.5° which is the first angle R1.

Second Embodiment

FIG. 7 is a view illustrating a second embodiment of an arrangement of a first sensor and a second sensor which are corresponding to a main magnet.

Referring to FIGS. 4 and 7, a first sensor S1 and a second sensor S2 disposed on an inside of a substrate 420 sense a change in magnetic flux by a main magnet 411.

The first sensor S1 may include three first Hall sensors H1. The first sensor S1 may generate a continuous sensing signal having a U-phase, a V-phase, and a W-phase corresponding to a rotation of the main magnet 411. The three first Hall sensors H1 may be disposed to be apart from each other by a third angle R3.

The second sensor S2 may include three second Hall sensors H2. The second sensor S2 may also additionally generate the continuous sensing signal having the U-phase, the V-phase, and the W-phase corresponding to the rotation of the main magnet 411. Accordingly, the continuous sensing signal having the U-phase, the V-phase, and the W-phase may be generated even when any first Hall sensor H1 of the first sensor S1 fails. The three second Hall sensors H2 may be disposed to be apart from each other by the third angle R3 in the same manner as the first Hall sensor H1.

Here, the third angle R3 may be calculated by Equation 5 below, $$R3=R0/3$$

$$R0=360°/(Nm/2) \quad \text{[Equation 5]}$$

wherein R3 is the third angle, R0 is an electrical angle, Nm is the number of poles of the main magnet, and a constant "3" refers to the number of a U-phase, a V-phase, and a W-phase.

For example, when the magnet 220 of the rotor 200 has six poles, the number of poles of the main magnet 411 is six. Thus, the electrical angle R0 of a corresponding motor is 120°. As a result, the first angle R1 may be calculated as 40°. For example, when the magnet 220 of the rotor 200 has eight poles, the electrical angle R0 of the corresponding motor is 90°.

The second sensor S2 may be disposed at a location shifted from a location corresponding to the first sensor S1 to increase a resolution of the sensing signal. In other words, when a location symmetrical with respect to each first Hall sensor H1 of the first sensor S1 is defined as "P" in FIG. 7 on the basis of a reference line CL passing through a center C of a shaft, the second Hall sensors H2 of the second sensor S2 may be located at a location shifted from the "P" in FIG. 7 by a fourth angle R4 in a circumferential direction.

Here, the fourth angle is R4 calculated by Equation 6 below, $$R4=R3 \pm R0'/(Nm/2) \quad \text{[Equation 6]}$$

wherein R4 is the fourth angle, R0' is an electrical angle to be shifted, and Nm is the number of poles of the main magnet 411.

The resolution of the sensing signal due to the main magnet 411 may be set to 60°, and here, in a case in which a shift by an electrical angle of 30° is required to increase the resolution two times from 60° to 30°, the second angle R2 may be calculated as 10°. Accordingly, in a case in which the number of poles of the main magnet 411 is 6, the resolution of the sensing signal may be increased from 60° to 30° when the second sensors S2 are disposed by moving clockwise or counterclockwise by 10° as compared to the first sensor S1.

FIG. 8 is a view illustrating a first sensor and a second sensor on the basis of an outer side sensor.

Referring to FIGS. 4 and 8, a plurality of sensors disposed on an outside of the substrate 420 may be classified into a first sensor S3 and a second sensor S4. The first sensor S3 and the second sensor S4 sense a change in magnetic flux by a sub-magnet 412.

The first sensor S3 may include two first Hall sensors H1. The first sensor S3 may generate a continuous sensing signal corresponding to a rotation of the sub-magnet 412. The two first Hall sensors H1 may be disposed to be apart from each other by a third angle R3.

Here, the third angle R3 may be calculated by Equation 7 below, $$R3=R0 \times n+R3'/(Ns/2) (n \text{ is an integer})$$

$$R0=360°/(Ns/2) \quad \text{[Equation 7]}$$

wherein R3 is the third angle, R0 is an electrical angle, R3' is a resolution angle, and Ns is the number of poles of the sub-magnet 412.

For example, when the number of poles of sub-magnet 412 is 72, the electrical angle R0 of a corresponding motor is 10°. When R3' is 90°, the third angle R3 is 10°×n+2.5°. Thus, it is very difficult to dispose the two first Hall sensors H1 physically apart from each other by the third angle R3. Accordingly, when the electrical angle R0 is 10°, 10°×n+2.5° having the same phase difference may be calculated as the third angle R3.

In addition, when the electrical angle R0 is 90° and a shift by an electrical angle of 45° is required, a fourth angle R4 may be calculated as 1.25° through Equation 8 below.

$$R4=R3 \pm R0'/(Ns/2) \quad \text{[Equation 8]}$$

wherein R4 is the fourth angle, R0' is an electrical angle to be shifted, and Ns is the number of poles of the sub-magnet 412.

Accordingly, when the number of poles of the sub-magnet 412 is 72, a resolution of the sensing signal may be set to 90°, and the resolution of the sensing signal may be increased from 90° to 45° when the second sensors S4 are disposed by moving clockwise or counterclockwise by 1.25° than the first sensor S3.

FIGS. 9A and 9B are graphs illustrating a comparison between a conventional sensing signal having a resolution of 60° (FIG. 9A) and a sensing signal increased in resolution to 30° (FIG. 9B) with respect to a main magnet.

When the number of poles of the main magnet 411 is six, as shown in FIG. 9A, the resolution of the sensing signal is confirmed as 60° by the first sensor S3. However, as shown in FIGS. 7 and 9B, the resolution of the sensing signal may be increased from 60° to 30° when the second sensor S2 is added and the second Hall sensors of the second sensor S2 (H2 in FIG. 7) are disposed in such a manner that locations thereof are shifted clockwise by 10° as compared to the first Hall sensor H1 of the first sensor S1. Thus, an initial driving location of the motor may be grasped more precisely.

FIGS. 10A and 10B are graphs illustrating a comparison between a conventional sensing signal having a resolution of 90° (FIG. 10A) and a sensing signal increased in resolution to 45° (FIG. 10B) with respect to a sub magnet.

When the number of poles of the sub-magnet 412 is 72, as shown in FIG. 10A, the resolution of the sensing signal is confirmed as 90° by the first sensor S3. However, as shown in FIGS. 8 and 10B, the resolution of the sensing signal may be increased from 90° to 45° when the second sensor S4 is added and second Hall sensors (H2 in FIG. 8) of the second sensor S4 are disposed in such a manner that locations thereof are shifted clockwise by 1.25° as compared to the first hall sensor H1 of the first sensor S3.

Third Embodiment

FIG. 11 is a view illustrating an extended region of a main magnet.

Referring to FIGS. 2 and 11, a main magnet 411 may include an extended region 411a extending toward a center of a magnet 410. The extended region 411a is a portion corresponding to a location of a third sensor 423 (in FIG. 13) added in parallel to a second sensor 422 (in FIG. 13). Meanwhile, a sub-magnet 412 is used to precisely grasp a detailed location of a rotor 200. For example, the sub-magnet 412 may have 72 poles.

Sensors may be disposed on a substrate 420. The sensors sense a change in magnetic flux according to a rotation of the magnet 410. The substrate 420 may be disposed above the magnet 410.

FIG. 12 is a view illustrating a sensing signal.

Referring to FIG. 12, the sensors disposed on the substrate 420 may sense three sensing signals T1, T2, and T3 by sensing a change in the N-pole and S-pole of the main magnet 411. In addition, two sensing signals E1 and E2 may be further sensed by sensing a change in magnetic flux of the sub-magnet 412.

As described above, since the magnet coupled to the rotor 200 is directly copied to the main magnet 411, the location of the rotor 200 may be sensed by sensing the change in magnetic flux on the basis of the main magnet 411. The sensing signals T1, T2, and T3 may be used for initial driving of a motor and may feed-back U-, V-, and W-phases information, respectively.

FIG. 13 is a view illustrating a rotor location sensing apparatus according to the embodiment, and FIG. 14 is a view illustrating a first sensor, a second sensor, and a third sensor.

Referring to FIGS. 13 and 14, the substrate 420 may include a first sensor 421, a second sensor 422, and a third sensor 423. The first sensor 421 senses a change in magnetic flux by the sub-magnet 412 according to a rotation of the magnet 410. The second sensor 422 and the third sensor 423 sense a change in the magnetic flux by the main magnet 411 according to a rotation of the magnet 410. The substrate 420 may be disposed in a form of drawing an arc corresponding to an arrangement of the main magnet 411 and the sub-magnet 412.

The first sensor 421, the second sensor 422, and the third sensor 423 may be respectively arranged on tracks O1, O2, and O3 which are different from each other with respect to a center C of the magnet 410. The first sensor 421 is disposed on an outer side of the second sensor 422, and the third sensor 423 is disposed on an inner side of the second sensor 422 in a radial direction of the magnet 410.

The first sensor 421 may include a plurality of first Hall sensors 421a (for example, four first Hall sensors), and the plurality of sensors may be disposed at regular intervals along an outer track O1 so as to be aligned with the sub-magnet 412.

The second sensor 422 may be disposed at regular intervals along a middle track O2 so that a plurality of second Hall sensors 422a (for example, three second Hall sensors) are aligned with the main magnet 411. The third sensor 423 may be disposed at regular intervals along an inner track O3 so that a plurality of third Hall sensors 423a (for example, three third Hall sensors) are aligned with the extended region 411a of the main magnet 411.

FIG. 15 is a view illustrating the second sensor and the third sensor which are aligned and disposed in a circumferential direction of the magnet.

Here, referring to FIG. 15, a second Hall sensor 422a of the second sensor 422 and a third Hall sensor 423a of the third sensor 423 are aligned and disposed in a circumferential direction of the magnet 410. The second Hall sensor 422a and the third Hall sensor 423a are disposed on different circular shaped tracks. In addition, since the second Hall sensor 422a and the third Hall sensor 423a are aligned on the basis of the circumferential direction of the magnet 410, even when the third Hall sensor 423a is added, it is not necessary to extend the substrate 420 or install a separate substrate 420 to connect with a cable. That is, a two-channel sensing structure may be implemented, and the limitation of an installation space may be overcome by securing a region, in which the third sensor 423 is mounted, inside the existing substrate 420 in the radial direction of the magnet 410. Correspondingly, as described above, the main magnet 411 includes the extended region 411a extending toward the center of the magnet 410.

The second sensor 422 may be electrically connected in parallel with the third sensor 423. Accordingly, when an abnormality occurs in the second sensor 422, the third sensor 423 may sense the sensing signal.

As described above, the rotor location sensing apparatus and the motor according to the embodiments of the present invention has been specifically described with reference to the accompanying drawings.

The above description is only an example describing a technological scope of the present invention. Various changes, modifications, and replacements may be made without departing from the spirit and scope of the present invention by those skilled in the art. Therefore, the embodiments disclosed above and in the accompanying drawings should be considered in a descriptive sense only and not for limiting the technological scope. The technological scope of the present invention is not limited by these embodiments and the accompanying drawings. The spirit and scope of the present invention should be interpreted by the appended claims and encompass all equivalents falling within the scope of the appended claims.

The invention claimed is:

1. A rotor location sensing apparatus, comprising:
a central shaft;
a magnet coupled to the central shaft; and
a sensor portion disposed corresponding to the magnet;
wherein the sensor portion comprises a substrate, a first group including a first Hall sensor and a third Hall sensor disposed on the substrate, and a second group including a second Hall sensor and a fourth Hall sensor,
wherein the first Hall sensor and the third Hall sensor are arranged to overlap in a radial direction about the central shaft, and the second Hall sensor and the fourth Hall sensor are arranged to overlap in a radial direction about the central shaft.

2. The apparatus of claim 1, wherein there are at least three each of the first Hall sensor and the second Hall sensor arranged on a first circumference about the central shaft, and there are at least two each of the third Hall sensor and the fourth Hall sensor arranged on a second circumference about the central shaft.

3. The apparatus of claim 2, wherein at least one of the three first Hall sensors overlaps at least one of the two third Hall sensors in a radial direction about central shaft, and at least one of the three second Hall sensors overlaps at least one of the two fourth Hall sensors in a radial direction about central shaft.

4. A rotor location sensing apparatus, comprising:
a central shaft;
a magnet coupled to the central shaft; and
a sensor portion disposed corresponding to the magnet;
wherein the sensor portion comprises a substrate, a first group including a plurality of Hall sensors disposed on the substrate, and a second group including a plurality of Hall sensors disposed on the substrate and spaced apart from the first group, wherein the plurality of Hall sensors of the first group and the plurality of Hall sensors of the second group operate independently, wherein the plurality of Hall sensors of the first group includes at least one first Hall sensor disposed on a first circumference about the central shaft and at least one third Hall sensor disposed on a second circumference about the central shaft, and wherein the plurality of Hall sensors of the second group includes at least one second Hall sensor disposed on the first circumference.

5. The apparatus of claim 4, wherein when one of the first group and the second group does not operate, the other group operates.

6. The apparatus of claim 4, wherein the plurality of Hall sensors of the first group includes at least three first Hall sensors disposed on a first circumference about the central shaft and at least two third Hall sensors disposed on a second circumference about the central shaft, and wherein the plurality of Hall sensors of the second group includes at least three second Hall sensors disposed on the first circumference and at least two fourth Hall sensors disposed on the second circumference.

7. A rotor location sensing apparatus, comprising:
a central shaft;
a magnet coupled to the central shaft; and
a sensor portion disposed corresponding to the magnet;
wherein the sensor portion comprises a substrate, a first group including a plurality of Hall sensors disposed on the substrate, and a second group including a plurality of Hall sensors,
wherein the plurality of Hall sensors of the first group includes at least three first Hall sensors disposed on a first circumference about the central shaft and at least two third Hall sensors disposed on a second circumference about the central shaft,
wherein the plurality of Hall sensors of the second group includes at least three second Hall sensors disposed on the first circumference and at least two fourth Hall sensors disposed on the second circumference.

8. The apparatus of claim 1, wherein the first group and the second group are disposed to be spaced apart from each other and operate independently of each other.

9. The apparatus of claim 2, wherein the radius of the second circumference is greater than the radius of the first circumference.

10. The apparatus of claim 9, wherein the magnet includes a main magnet disposed corresponding to the first circumference and a sub magnet disposed corresponding to the second circumference, wherein the three first Hall sensors and the three second Hall sensors sense a change in the main magnet, and
wherein the two third Hall sensors and the two fourth Hall sensors sense a change in the sub-magnet.

11. The apparatus of claim 2, wherein the distance between the three first Hall sensors and the distance between the three second Hall sensors on the first circumference is a first distance, wherein the distance between a first Hail sensor adjacent to the second group among the three first Hall sensors on the first circumference and a second Hall sensor adjacent to the first group among the three second Hall sensors is a second distance, and wherein the first distance and the second distance are different.

12. The apparatus of claim 11, wherein the second distance is greater than the first distance.

13. The apparatus of claim 2, wherein an angle between straight lines connecting the central shaft to a center of each of two adjacent first Hall sensors among the three first Hall sensors and an angle between straight lines connecting the central shaft to a center of each of two adjacent second Hall sensors among the three second Hall sensors are referred to as a first angle, and wherein an angle between straight lines connecting the central shaft to a center of each of the first Hall sensor and the second Hall sensor that are adjacent to each other among the three first Hall sensors and the three second Hall sensors is referred to as a second angle and is different from the first angle.

14. The apparatus of claim 13, wherein an angle between straight lines connecting the central shaft to a center of each of two adjacent third Hall sensors among the at least two third Hall sensors and an angle between straight lines connecting the central shaft to a center of each of two adjacent fourth Hall sensors among the at least two fourth Hall sensors are referred to as a third angle, and wherein an angle between straight lines connecting the central shaft to a center of each of the third Hall sensor and the fourth Hall sensor that are adjacent to each other among the at least two third Hall sensors and the at least two fourth Hall sensors is referred to as a fourth angle and is different from the third angle.

15. The apparatus of claim 13, wherein the first angle is R1 calculated by Equation 1 below, $$R1 = R0/3$$

$$R0 = 360°/(Nm/2) \qquad \text{[Equation 1]}$$

wherein R1 is the first angle, R0 is an electrical angle, and Nm is the number of poles of the main magnet and a constant "3" refers to the number of a U-phase, a V-phase, and a W-phase.

16. The apparatus of claim 7, wherein the first group and the second group are disposed to be spaced apart from each other and operate independently of each other.

17. The apparatus of claim 6, wherein a radius of the second circumference is greater than a radius of the first circumference, wherein the magnet includes a main magnet disposed corresponding to the first circumference and a sub magnet disposed corresponding to the second circumference, wherein the three first Hall sensors and the three second Hall sensors sense a change in the main magnet, and
wherein the two third Hall sensors and the two fourth Hall sensors sense a change in the sub-magnet.

18. The apparatus of claim 7, wherein a radius of the second circumference is greater than a radius of the first circumference, wherein the magnet includes a main magnet disposed corresponding to the first circumference and a sub magnet disposed corresponding to the second circumference, wherein the three first Hall sensors and the three second Hall sensors sense a change in the main magnet, and
wherein the two third Hall sensors and the two fourth Hall sensors sense a change in the sub-magnet.

19. The apparatus of claim 6,
wherein an angle between straight lines connecting the central shaft to a center of each of two adjacent first Hall sensors among the three first Hall sensors and an angle between straight lines connecting the central shaft to a center of each of two adjacent second Hall sensors among the three second Hall sensors are referred to as a first angle, and
wherein an angle between straight lines connecting the central shaft to a center of each of the first Hall sensor and the second Hall sensor that are adjacent to each other among the three first Hall sensors and the three second Hall sensors is referred to as a second angle and is different from the first angle.

20. The apparatus of claim 7,
wherein an angle between straight lines connecting the central shaft to a center of each of two adjacent first Hall sensors among the three first Hall sensors and an angle between straight lines connecting the central shaft to a center of each of two adjacent second Hall sensors among the three second Hall sensors are referred to as a first angle, and
wherein an angle between straight lines connecting the central shaft to a center of each of the first Hall sensor and the second Hall sensor that are adjacent to each other among the three first Hall sensors and the three second Hall sensors is referred to as a second angle and is different from the first angle.

\* \* \* \* \*